United States Patent [19]

Warren

[11] Patent Number: 4,666,571

[45] Date of Patent: May 19, 1987

[54] CONDUCTING POLYMER AND A METHOD OF PRODUCING SAME

[75] Inventor: Leslie F. Warren, Camarillo, Calif.

[73] Assignee: Rockwell International Corporation, El Segundo, Calif.

[21] Appl. No.: 889,134

[22] Filed: Jul. 24, 1986

[51] Int. Cl.⁴ .............................................. C25C 1/00
[52] U.S. Cl. ................................................ 204/59 R
[58] Field of Search ..................................... 204/59 R

[56] References Cited

U.S. PATENT DOCUMENTS 4,547,270 10/1985 Naarmann ........................ 204/59 R
4,566,955 1/1986 Naarmann ........................ 204/59 R Primary Examiner—R. L. Andrews
Attorney, Agent, or Firm—H. Frederick Hamann; Craig O. Malin

[57] ABSTRACT

A conducting polymer is produced using cathodic deposition in an electrolyte. The electrolyte comprises a solvent such as acetonitrile, carbon disulfide, a supporting electrolyte cation, and a transition metal ion. At a voltage of about −0.70 or higher, the carbon disulfide is reduced in the presence of the transition metal ion and a conducting polymer is deposited on the cathode.

10 Claims, No Drawings

CONDUCTING POLYMER AND A METHOD OF PRODUCING SAME

BACKGROUND OF THE INVENTION

This invention relates to the field of conducting organic polymers, and particularly to a conducting organic polymer which is electrochemically deposited on a cathode.

Within the last several years, polymers have been discovered which have high electrical conductivity. Although there are many potential applications for conducting polymers, their use has been thwarted by chemical instability, poor mechanical properties, difficult fabricability, and/or the inability to apply them to suitable substrate materials.

Both chemical precipitation and electrochemical methods have been used to produce conductive polymers. In the prior art electrochemical methods, a conducting polymer, such as polypyrrole, is deposited on an anode from an electrolyte. See for example "Electrochemistry of Conducting Polypyrrole Films" by A. F. Diaz in the *Journal of Electroanalytical Chemistry*, 129, (1981), pp. 115-132. Anode materials in these cases are limited to noble metals and to a few stable semiconductors which do not themselves oxidize (or dissolve) during the deposition process. Consequently, prior art substrates for electrochemically-produced polymers were limited to these few anode materials.

Chemical precipitation has also been used to produce conducting polymers based upon transition metal ion-bridged tetrathiooxalate ($C_2S_4^{2-}$, or $TTO^{2-}$) liquids derived from the two-electron reduction of carbon disulfide. These polymers, prepared from the reaction of $TTO^{2-}$ with nickel, copper, or palladium (2+) salts, appear to consist of short chain oligomers having about three metal atoms, four TTO anions, and one cation ($Et_4N^+$). They have conductivity values of up to 20 (ohm-cm)$^{-1}$. This chemical precipitation process is described by J. R. Reynolds et al in an article titled "Electrically Conducting Transition Metal Complexes of Tetrathio-oxalate", in the *Journal of the Chemical Society, Chemical Communications*, 1985, pp. 268-269.

There is a continuing need for new conducting polymers having higher structural order and higher conductivities; and for new methods of forming these polymers so that coherent thin films can be formed on a wide variety of cathode substrates rather than upon only substrates which are suitable for anodes in electrochemical processes.

SUMMARY OF THE INVENTION

It is an object of the invention to provide a method of electrochemically depositing a conducting polymer on a cathode.

It is an object of the invention to provide a conducting polymer which is stable in air and which has high electrical conductivity.

It is an object of the invention to provide a coherent, thin film conductive polymer on a wide variety of substrates.

According to the invention, a conducting polymer based on metal iron-bridged tetrathio-oxalate ligands is derived from the direct electrochemical reduction of carbon disulfide in an electrolyte in the presence of anhydrous metal salts of $Ni^{2+}$, $Co^{2+}$, or $Fe^{2+}$. The electrolyte comprises a solvent such as acetonitrile with carbon disulfide, a supporting electrolyte cation, and a transition metal ion. Suitable supporting electrolyte cations can be obtained by adding $Et_4NBF_4$, $Et_4NPF_6$, $Bu_4NPF_6$, cetylpyridinium+$ClO_4^-$, and/or $Bu_4NPF_6$ to the electrolyte. Suitable transition metal ions can be obtained by adding $Ni(CH_3CN)_6(BF_4)_2$, $Fe(ClO_4)_2 \cdot 6H_2O$, and/or $CoCl_2$ to the electrolyte.

The carbon disulfide in the electrolyte is reduced directly by applying a negative voltage of at least $-0.7$ volts to the cathode. This causes a conducting polymer to deposit on the cathode.

DESCRIPTION OF THE PREFERRED EMBODIMENT

A method has been discovered for producing conducting polymers by a cathodic (rather than an anodic) electrochemical process. In this process, a metal ion-bridged tetrathio-oxalate ligand is derived from the direct electrochemical reduction of carbon disulfide in an electrolyte in the presence of anhydrous metal salts of $Ni^{2+}$, $Co^{2+}$, or $Fe^{2+}$. The electrolyte comprises a solvent such as acetonitrile with carbon disulfide, a supporting electrolyte cation, and a transition metal ion ($Ni^{2+}$, $Co^{2+}$, or $Fe^{2+}$).

Suitable supporting electrolyte cations can be provided by adding $Et_4NBF_4$, $Et_4NPF_6$, cetylpyridinium $ClO_4$, and/or $Bu_4NPF_6$ to the electrolyte.

Suitable transition metal ions can be provided by adding $Ni(CH_3CN)_6(BF_4)_2$, $Fe(ClO_4)_2 \cdot 6H_2O$, and/or $CoCl_2$ to the electrolyte.

The carbon disulfide in the electrolyte is reduced directly by applying a negative voltage of at least $-0.7$ volts to the cathode. This causes the conducting polymer to be deposited on the cathode.

A cathodic potential excursion in these electrolytes produced a sudden, sharp current increase corresponding to polymer growth in each of the metal systems at $-0.7$ volts vs SCE. Under potentiostatic control with solution agitation, uniform dark brown to black deposits formed on the cathode surface at $-0.8$ volts. The films continued to grow under these conditions with no apparent drop in the deposition current, indicative of highly conducting materials. The deposits were stable in air.

It is important to note that the starting iron, cobalt, and nickel salts alone in an acetonitrile $-Et_4NBF_4$ electrolyte did not exhibit reduction currents (elemental metal deposition) until at least $-1.1$ volts. Carbon disulfide alone began to reduce at about $-1.4$ volts. Thus, formation of the deposits at $-0.7$ volts in the electrolyte containing both the metal salts and the $CS_2$ was the result of a separate compound (the conducting polymer) being formed, and not the reduction of the individual ingredients.

The following examples illustrate the method used to produce conducting polymers according to the invention.

EXAMPLE I—NICKEL AND $Et_4NBF_4$

An electrolyte was prepared using 0.1M $Et_4NBF_4$ in acetonitrile (3A molecular sieve-dried). About 2 ml of $CS_2$ and a small amount of $Ni(CH_3CN)_6(BF_4)_2$ to the extent of ca. 0.01M were dissolved in 40 ml of the electrolyte. The electrolyte was stirred and covered with a nitrogen atmosphere during deposition. A gold cathode and a platinum anode were used to reduce the $CS_2$ and thereby deposit a conducting organic polymer on the gold cathode. Reduction of the $CS_2$ began at $-0.7$ volts vs the SCE.

Under potentiostatic control, a uniform dark brown to black deposit formed on the cathode surface at $-0.8$ volts. The film continued to grow under these conditions with no apparent drop in the deposition current, indicative of highly conducting materials. Under a microscope, the deposit appeared smooth.

EXAMPLE II—IRON AND $Et_4NPF_6$

An electrolyte was prepared using 0.1M $Et_4NBF_4$ (1.38 g of salt) in 50 ml of acetonitrile. Two ml of $CS_2$ (equivalent to 0.66M) and 0.18 g of $Fe(ClO_4)_2 \cdot 6H_2O$ (0.01M) were dissolved in the electrolyte, and it was purged with nitrogen.

A gold disc electrode with an area of 0.44 cm$^2$ was used for the cathode. Thick dark films were formed on the cathode when it was rotated at 50 rpm at either a constant potential of $-0.75$ volts (vs the SCE) and approximately 3.25 milliamps or at a constant current of 2 milliamps and approximately $-0.7$ volts. Intact, brittle films were also obtained at a lower current of 1 milliamp (a current density of approximately 2.2 milliamps per cm$^2$). These films were formed at room temperature.

EXAMPLE III—COBALT AND $Et_4NPF_6$

An electrolyte was prepared in a beaker under nitrogen using 200 ml of acetonitrile, 5.5 g of $Et_4NPF_6$ (0.1M), 0.26 g of $CoCl_2$ (0.01M), and 8 ml of $CS_2$. The anode was Ti foil which was perforated and coiled around the inside of the beaker. The cathode was a 10 cm$^2$ mandrel ring of Inconel. An adherent, black film with a powdery outer layer was formed at 10° C. using 10 milliamps current.

EXAMPLE IV—IRON AND $Bu_4NPF_6$

A conductive polymer film was deposited on a cathode under the conditions described for Example II except that $Bu_4NPF_6$ was used rather than $Et_4NPF_6$.

EXAMPLE V—IRON AND CETYLPYRIDINIUM$^+$ $ClO_4^-$

A brittle conductive polymer film which self-destructed mechanically was deposited on a cathode under the conditions described for Example II except that cetylpyridinium$^+$ $ClO_4^-$ was used rather than $Et_4NPF_6$.

EXAMPLE VI—COBALT AND $Bu_4NPF_6$

An electrolyte was prepared using 5.8 g of $Bu_4NPF_6$ in 150 ml of acetonitrile (equivalent to 0.1M $Bu_4NPF_6$), 0.2 g of $CoCl_2$, and about 6 ml of $CS_2$. A cathodic film was deposited on a cathode such as described in Example III at a current of 10 milliamps after 1600 seconds. The film adhered tightly to the cathode, but had a powdery outer later which wiped off easily similar to the film obtained in Example III.

EXAMPLE VII—COBALT, $Bu_4NPF_6$, AND $Et_4NPF_6$

Electrodeposition was under the same conditions as described in Example VI except that the electrolyte was prepared using 0.05M $Bu_4NPF_6$ and 0.05M $Et_4NPF_6$ rather than 0.1M $Bu_4NPF_6$. An adherent film with a powdery outer layer was also obtained.

EXAMPLE VIII—COBALT, $Bu_4NPF_6$, $Et_4NPF_6$, AND CETYLPYRIDINIUM$^+$ $ClO_4^-$

Electrodeposition was under the same conditions as described in Example VI except that 40 ml of 0.08M cetylpyridinium$^+$ $ClO_4^-$ was added to the electrolyte. The deposit obtained after 1900 seconds was smoother than the deposit obtained in Example VII and the outer layer could be wiped off only with difficulty.

When electrodeposition was at 20 milliamps rather than 10 milliamps, a poor deposit which washed off the entire cathode was obtained. Evidently, 20 milliamps provides too high a current density.

EXAMPLE IX—COBALT AND CETYLPYRIDINIUM$^+$ $ClO_4^-$

An electrolyte was prepared using cetylpyridinium$^+$ $ClO_4^-$ (molecular weight of 404) in acetonitrile (.0.0825 M). Six ml of $CS_2$ and 0.2 g of $CoCl_2$ were dissolved in the electrolyte, and it was purged with nitrogen. A film was formed on an Inconel cathode such as described in Example III at a desposition current of 10 milliamps. The brittle film self-destructed mechanically due to residual plating stress.

Although the complete stoichiometry of the electrochemical deposits produced in Examples I-IX is not yet known, they probably resemble the chemically precipitated tetrathio-oxaltes reported by J. R. Reynolds, et al. in the above referenced articles for $Ni^{2+}$, $Cu^{2+}$, and $Pd^{2+}$ metal ions. However, in addition to the above described $Ni^{2+}$ - containing complex (Example I), the electrochemical method of the invention has been used to produce two new complexes incorporating $Co^{2+}$ or $Fe^{2+}$ metal ions (Examples II-IX). The polymer structure of these two new complexes according to the invention are:

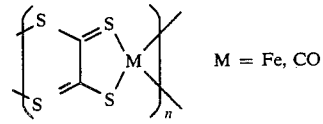

M = Fe, CO

Although these polymers have not yet been fully characterized (deposition optimization, bulk conductivities, elemental compositions, charge carrier types, etc.), it is evident that they represent new electrochemically deposited conducting polymers. Bridging of the TTO ligands about the metal atoms as shown above would impart a ladder polymer structure to these polymers. Strong interchain stacking should play a significant role in ordering the polymer (or oligomer) chains and thus affect the conductivity via inter-chain-hopping. Extension of these new materials to semiconductors (both n- and p- types) and to non-noble metal substrates can be expected to generate considerable use for corrosion inhibition and in electronic applications where non-metallic conductors are required.

Numerous variations and modifications can be made without departing from the invention. For example, a wide variety of cathode substrates can be used because the polymer is deposited on a cathode (rather than the anode) in the electrolyte. Solvents other than the exemplary acetonitrile can be used provided that they are non-reactive with the solutes. For example, alkyl or aryl nitriles (represented as RCN) can be used as the solvent. Similarly, the supporting electrolyte cations and transition metal ions can be provided by compounds other than those used to illustrate the invention. Accordingly, it should be understood that the form of the invention described above is illustrative and is not intended to limit the scope of the invention.

What is claimed is:

1. A method of producing a conducting polymer comprising the steps of:
   providing an electrolyte comprising a non-reactive solvent, carbon disulfide, a supporting electrolyte cation, and a transition metal ion;
   immersing a cathode in said electrolyte; and
   applying a negative voltage to said cathode to reduce said carbon disulfide and incorporate said transition metal ion into a conducting polymer which is deposited on said cathode.

2. The method as claimed in claim 1 wherein said supporting electrolyte cation is obtained by adding to said electrolyte one or more salts selected from the group consisting of $Et_4NBF_4$, $Et_4NPF_6$, $Bu_4NPF_6$, cetylpyridinium$^+$ $ClO_4^-$, and $Bu_4NPF_6$.

3. The method as claimed in claim 1, wherein said transition metal ion is obtained by adding to said electrolyte one or more compounds selected from the group consisting of $Ni(CH_3CN)_6(BF_4)_2$, $Fe(ClO_4)_4 \cdot 6H_2O$, and $CoCl_2$.

4. The method as claimed in claim 1 wherein said transition metal ion is selected from the group consisting of $Ni^{2+}$, $Co^{2+}$, and $Fe^{2+}$.

5. The method as claimed in claim 1, wherein said step of applying a negative voltage comprises applying a voltage of at least $-0.7$ volts.

6. The method as claimed in claim 1, wherein said non-reactive solvent comprises RCN where:
   CN is a nitrile radical, and
   R is an alkyl or aryl radical.

7. The method as claimed in claim 1, wherein said non-reactive solvent comprises acetonitrile.

8. The method as claimed in claim 1, wherein said supporting electrolyte cation is selected from the group of cations consisting of $R_4N^+$, $R_4P^+$, $R_4As^+$, $R_3S^+$, where R is an alkyl or aryl radical.

9. The method as claimed in claim 1, wherein said supporting electrolyte cation is a metal ion.

10. A conducting polymer produced according to the method as claimed in claim 1.

* * * * *